United States Patent Office 2,698,551
Patented Jan. 4, 1955

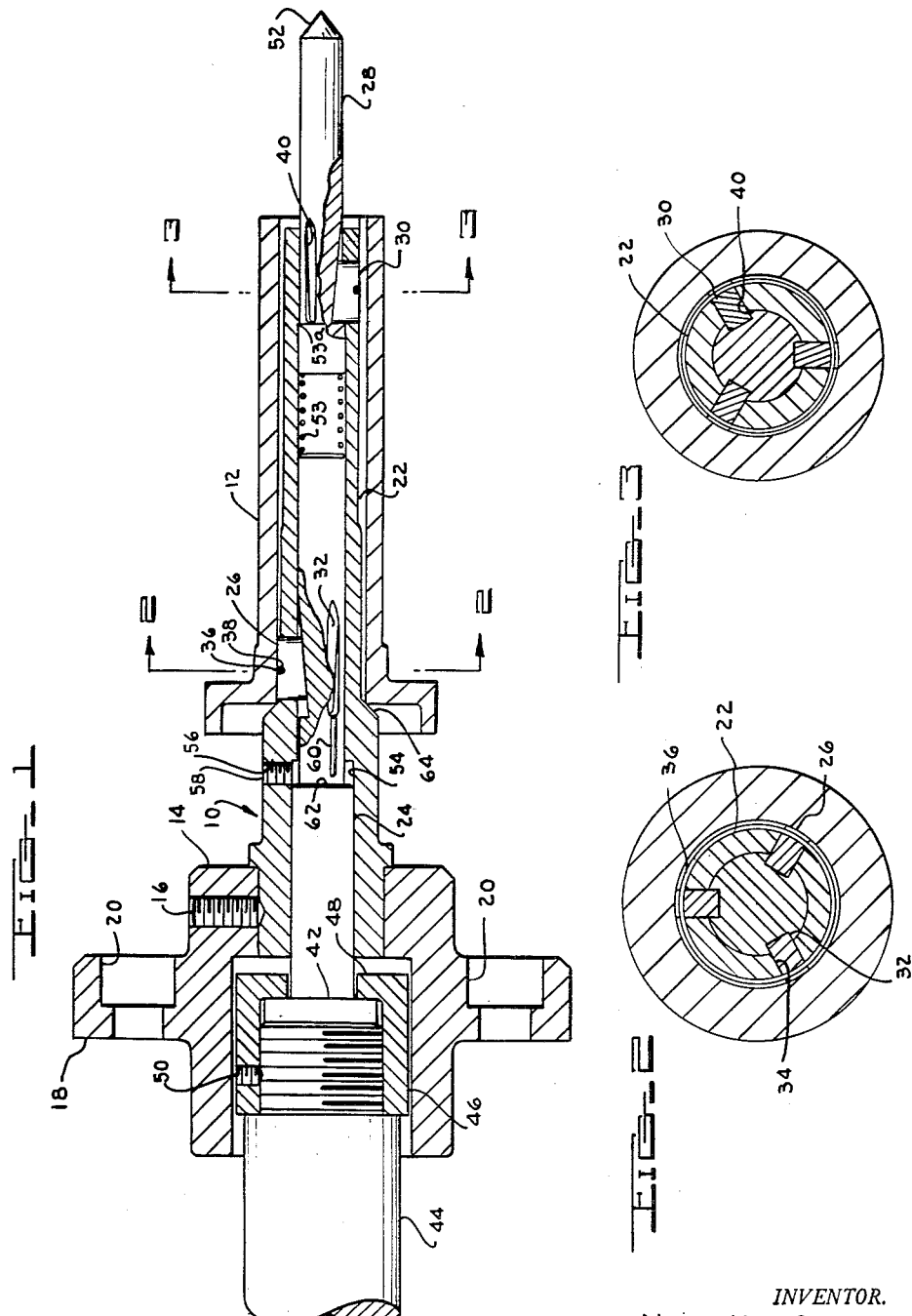

2,698,551

DOUBLE INTERNAL CHUCKING DEVICE

Niels H. F. Olsen, Dearborn, Mich., assignor to Hexagon Tool & Engineering Company, Dearborn, Mich., a corporation of Michigan Application May 18, 1950, Serial No. 162,721

5 Claims. (Cl. 82—44)

The present invention relates to a chucking device, and more particularly to a double internal chuck adapted primarily, but not exclusively, for centering and supporting a workpiece of cylindrical shape in a machine tool, such as a lathe or the like, to permit turning operations to be performed simultaneously on opposite ends of said workpiece.

Difficulty is encountered when it is desired to perform simultaneously such end turning operations in a machine tool, since in carrying out these cutting operations it is necessary that the workpiece be centered in the machine tool with both ends of the workpiece sufficiently free to provide clearance for the cutting tools.

Accordingly, it is a primary object of the present invention to provide a chucking device for a machine tool which will support and center the workpiece while providing sufficient clearance at the ends of the workpiece to operate the cutting tool.

More particularly, it is an object of the present invention to provide a double internal chucking device having expansible jaws adapted to engage the inner surface of a hollow workpiece for supporting and centering the same, said jaws being actuated by longitudinal movement of a pair of plungers having their outer ends mounted, respectively, in the headstock and tailstock of a lathe or the like.

It is a further object of the present invention to provide a chucking device adapted particularly, but not exclusively, for use with a lathe for mass production work, said device being constructed and arranged to withstand rough treatment and repeated opening and closing of the expansible jaws without failure, and having a self-lubricating means for lubricating the expansible jaws.

It is still a further object of the present invention to provide an internal chucking device having expansible jaws seated in tapered slots of a plunger and actuated by longitudinal movement of said plunger, said chucking device including means for securing said plunger to the headstock of a lathe or the like while providing proper alignment of said slots and said jaws seated therein.

Other objects of this invention will appear in the following description and appended claims, reference being had to the accompanying drawings forming a part of this specification wherein like reference characters designate corresponding parts in the several views.

In the drawings:

Fig. 1 is a longitudinal sectional view of an internal chucking device embodying the present invention and showing the device supporting a workpiece and being connected to a longitudinally movable ram of a lathe headstock.

Fig. 2 is a sectional view taken on the line 2—2 of Fig. 1.

Fig. 3 is a sectional view taken on the line 3—3 of Fig. 1.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an internal chucking device 10 is shown supporting thereon a workpiece 12. The chucking device 10 extends into a collar 14 and is secured thereto by means of a set screw 16. The collar 14 has an annular flange 18 provided with a plurality of apertures 20 for securing said collar to the headstock of a lathe.

The internal chucking device 10 comprises a sleeve member 22 having a headstock plunger 24 extending into one end of said sleeve member 22 for actuating a set of expansible jaws 26 and a tailstock plunger 28 extending into the other end of said sleeve member 22 for actuating a second set of expansible jaws 30.

The headstock plunger 24 has a plurality of tapered slots 32, each of which is adapted to receive one of the jaws of the set of expansible jaws 26. As can be seen in Fig. 1, each of these jaws has a beveled lower portion adapted to seat in one of the slots 32. Each of the jaws extends through an aperture 34 formed in the sleeve 22. The jaws are retained in place and prevented from falling out of the sleeve 22 by means of the spring retainer 36 which extends around the periphery of the set of jaws and passes through each of the recessed slots 38 in each of the jaws.

Referring to Fig. 1, it can be seen that when the headstock plunger 24 is moved to the left, the jaws 26 will slide in the tapered slot 32 causing them to be expanded into engagement with the workpiece 12. When it is desired to release the workpiece 12 from the set of jaws 26, the headstock plunger 24 is moved to the right permitting the set of jaws 26 to be contracted by virtue of the biasing action of the retainer spring 36.

The operation of the tailstock plunger 28 with respect to the set of jaws 30 is similar to that of the headstock plunger 24 with respect to the set of jaws 26. The operations differ, however, to the extent that the tapered slots 40 are tapered in the opposite direction from the taper of the slots 32 so that the set of jaws 30 will be expanded when the plunger 28 is moved to the left, and conversely, the set of jaws 30 will be contracted when the said plunger 28 is moved to the right. As can be seen in Fig. 1 of the drawings, the set of jaws 30 are in a contracted state and are not supporting the workpiece 12. The jaws will be caused to engage the workpiece 12 merely by movement of the plunger 28 to the left.

The chucking device of the present invention is primarily intended for use in mass production work. In order to facilitate rapid loading and unloading of the workpiece on the chucking device, the headstock plunger 24 has a head portion 42 which is secured for longitudinal movement with the ram 44 of the lathe headstock. The coupling or locking member 46, having an inwardly turned flange 48, is screwed on the ram 44 and locked in place thereon by means of the set screw 50. The coupling or locking member 46 is provided for securing the plunger 24 to the ram 44 so that the plunger 24 may be drawn into a loose engagement with the ram 44 when assembling the present chucking device on the lathe, and thereafter the sleeve 22 containing the set of jaws 26 can be placed over the plunger 24 and secured to the collar 14 with the set of jaws 26 in proper alignment with the slots 32. It is believed to be readily apparent that if the slots 32 and set of jaws 26 are not in proper alignment, such alignment can be obtained merely by turning the plunger 24 in the coupling or locking member 46 to the proper position with respect to the sleeve 22.

From the above description, it can be seen that the plunger 24 can be actuated by the ram 44 to cause the set of jaws 26 to engage or release the workpiece 12. Any type of conventional hydraulic or pneumatic means for axially actuating the ram 44 may be employed.

Suitable means are also provided for mounting the chucking device in the tailstock of the lathe. The tailstock plunger 28 has a conical end portion 52 adapted to extend into the live center of the lathe. Any type of conventional hydraulic or pneumatic actuating means for axially moving the live center may be employed for the purpose of moving the plunger 28 longitudinally.

An important feature of the present invention is the provision of a 5 degree taper in the slot 32 and 6 degree taper in the slot 40. In using the present internal chucking device, it is advantageous to have the set of jaws 26 engage and release the workpiece 12 prior to such corresponding action of the set of jaws 30. By providing this relationship between the respective sets of jaws, the operator will not have the problem of releasing the set of jaws 30 manually in the event the set of jaws 26 release first.

In order to cause the set of jaws 30 to release when the ram 44 and the live center (not shown) of the tailstock are moved to the right, a coil spring 53 is mounted in compression between plungers 24 and 28, which spring will bias plunger 28 to the right when said plunger 28 is released by the live center (not shown). The extent of movement of the plunger 28 is limited by the stop or shoulder 53a which prevents the plunger 28 from being biased out of sleeve 22. If desired, the spring 53 can be eliminated and the plunger 28 can be lengthened so as to be contacted by the plunger 24, thereby to be moved to the right by a corresponding movement of the plunger 24. However, this arrangement is not satisfactory for all purposes since unnecessary pounding of the chucking device may occur on engagement of the said plungers.

Another feature of the present invention is the provision of the tapered slots 32 and 40 in place of an annular tapered portion on the respective plungers. It is found that the plungers are stronger when the slotted arrangement is used. The plunger 24 in particular, undergoes considerable strain when it is drawn to the left for the purpose of expanding the jaws 26. In order to reduce such strains to a minimum, it is found highly desirable to polish the slots 32 and it is also desirable to chrome plate the plunger. This tends to reduce the frictional engagement between the set of jaws and the plungers during longitudinal movement of the latter. The provision of the slots 32 and 40 also has another advantage in that the expansible jaws are provided with a much more rigid support to prevent them from being tilted out of line or placed under unnecessary stresses and strains during turning operations of the machine tool.

Another feature of the present invention is the provision of a lubricating system for lubricating the beveled portions of the set of jaws 26 to reduce to a minimum the sticking or dragging of said set of jaws 26 and the plunger 24. The lubricant is filled into the annular chamber 54 through the aperture 56 which is closed by the set screw 58. If desired, any conventional type of grease cup or Alemite fitting may be screwed into the port 56. Communication between the annular chamber 54 and the slot 32 is provided by the grooved passageways 60. The lubricant is worked from the annular chamber 54 to the slot 36 by the shoulder 62 of the plunger 24. Referring to Fig. 1, when the plunger 24 is moved to the right, the shoulder 62 likewise, will move to the right reducing the volume of the annular chamber 54 and thereby forcing the lubricant through the passage at 60 into the slot 32. Thus, each time the ram 44 is moved to the right to release the jaws 26, a limited amount of grease will be packed into the slots 32 insuring that there will be a lubricant therein when the ram 44 is moved to the left to again lock the jaws 26.

Still another feature of the present chucking device is the radial arrangement of the expansible jaws 26 with respect to the expansible jaws 30. As is best seen in Figs. 2 and 3, the respective jaws of each set are 60 degrees out of phase. This ensures that the workpiece 12 will be rigidly mounted on the expansible jaws, while at the same time it avoids distorting the workpiece 12. Such distortion or even splitting of workpieces is found to occur when such workpiece is relatively thin or brittle and when the respective jaws of each set of jaws 26 and 30 are in axial alignment.

From the above description, it can be seen that an internal chucking device has been provided, particularly adapted for use with a lathe and which will permit a tubular or hollow workpiece to be quickly mounted thereon and supported and centered thereon while cutting operations are being performed simultaneously on both ends of said workpiece. The chucking device is constructed so that it will not easily fail during operation and has a self-lubricating means for lubricating the expansible jaws. Further, the chucking device is constructed so that it can be quickly assembled on the lathe without difficulty in aligning the different parts.

Having thus described my invention, I claim:

1. A double internal chucking device for use in a lathe having an axially movable ram in the headstock thereof; a work holding member adapted to extend through a hollow workpiece, a set of expansible jaws mounted in said work holding member; a plunger extending into one end of said work holding member and having a plurality of longitudinal tapered slots each receiving one jaw from said set of expansible jaws; and means at the outer end of said plunger for securing said plunger to said ram for axial movement therewith and so that relative rotation therebetween is provided, whereby in assembling the chucking device on the lathe the slots of said plunger may be aligned with the jaws of said work holding member and in operation the jaws will be expanded and contracted by axial movement of said ram; a second set of expansible jaws mounted in said work holding member in longitudinally spaced relation to said first-named set and a second plunger extending into the other end of said work holding member for actuating said second set of expansible jaws on longitudinal movement thereof.

2. A double internal chucking device as claimed in claim 1 wherein the taper of the first-named slots is less than the taper of the second-named slots to permit the first-named set of jaws to contract after such action by the second set of jaws when said plungers are longitudinally actuated substantially simultaneously.

3. A double internal chucking device for use in a lathe having an axially movable ram in the headstock thereof, a work holding member adapted to extend through a hollow workpiece, a set of expansible jaws mounted in said work holding member, a plunger extending into one end of said work holding member and having a plurality of longitudinal tapered slots each receiving one jaw from said set of expansible jaws, and means at the outer end of said plunger for securing said plunger to said ram for axial movement therewith and so that relative rotation therebetween is provided whereby in assembling the chucking device on the lathe the slots of said plunger may be aligned with the jaws of said work holding member and in operation the jaws will be expanded and contracted by axial movement of said ram, a second set of expansible jaws mounted in said work holding member in longitudinally spaced relation to said first-named set, a second plunger extending into the other end of said work holding member for actuating said second set of expansible jaws on longitudinal movement thereof, and a spring member in operative engagement with said second plunger for biasing said plunger outwardly of said work holding member.

4. A chucking device for use in a machine tool having an axially movable ram, a work holding member adapted to extend through a hollow workpiece, a set of expansible jaws mounted in said work holding member, a plunger extending into one end of said work holding member and having a tapered portion for receiving the inner ends of said expansible jaws, an annular chamber formed between said work holding member and said plunger, said chamber being located intermediate said tapered portion and said one end of the work holding member and having axially spaced inner and outer end walls formed respectively by said work holding member and said plunger, conduit means forming communication between said chamber and said tapered portion, and means for supplying a lubricant to said chamber, whereby when said plunger is moved inwardly in said member the plunger will force the lubricant from said chamber through the conduit means to said tapered portion.

5. A double internal chucking device for use in a machine tool having an axially movable ram, a work holding member adapted to extend through a hollow workpiece, a set of expansible jaws mounted in said work holding member, a plunger extending into one end of said work holding member and having a tapered portion for receiving the inner ends of said expansible jaws, an annular chamber formed between said work holding member and said plunger, said chamber being located intermediate said tapered portion and said one end of the work holding member and having axially spaced inner and outer end walls formed respectively by said work holding member and said plunger, conduit means forming communication between said chamber and said tapered portion, means for supplying a lubricant to said chamber so that when said plunger is moved inwardly in said member the plunger will force the lubricant from said chamber through the conduit means to said tapered portion, a second set of expansible jaws mounted in said work holding member in longitudinally spaced relation to said first-named set, and a second plunger extending into the other end of said work holding member for actuating said second set of expansible jaws on longitudinal movement thereof.

References Cited in the file of this patent

UNITED STATES PATENTS

| | | | |
|---|---|---|---|
| 60,214 | Maltby | | Dec. 4, 1866 |
| 749,202 | Klay | | Jan. 12, 1904 |
| 927,424 | | | |
| 984,809 | | | |
| 1,074,280 | | | |
| 1,191,092 | | | |
| 1,241,319 | | | |
| 1,334,335 | | | |
| 1,825,925 | | | |
| 1,873,515 | | | |
| 2,397,773 | | | |
| 2,535,246 | | | |
| | McClellan | | July 6, 1909 |
| | Goodrich | | Feb. 21, 1911 |
| | Miller | | Sept. 30, 1913 |
| | Notz | | July 11, 1916 |
| | Wiley | | Sept. 25, 1917 |
| | Warren | | Mar. 23, 1920 |
| | Shenk | | Oct. 6, 1931 |
| | Warren | | Aug. 2, 1932 |
| | Beedle | | Apr. 2, 1946 |
| | Welch | | Dec. 26, 1950 |

FOREIGN PATENTS

| 300,209 | Italy | Sept. 1, 1932 |
|---|---|---|